April 21, 1936.　　　　E. H. LANGE　　　　2,037,800
AUTOMOBILE CONTROL MECHANISM
Filed Oct. 24, 1932　　　2 Sheets-Sheet 2

WITNESS:　　　　　　　　　　　　INVENTOR
B. A. Greene.　　　　　　　　　Edward H. Lange

Patented Apr. 21, 1936

2,037,800

UNITED STATES PATENT OFFICE 2,037,800

AUTOMOBILE CONTROL MECHANISM

Edward H. Lange, Baltimore, Md.

Application October 24, 1932, Serial No. 639,232

19 Claims. (Cl. 192—.01)

This invention relates to control mechanism for automobiles, and has for its principal object the simplification of control operations in starting and while running. An important feature of this invention is the combination of an automatic power control mechanism and an automatic clutch operating mechanism, by means of which the power is automatically controlled in starting and while running, through the use of a single control member requiring only occasional attention of the operator.

An object of this invention is to provide a unified automotive control system in which the brake control member is the primary member directly controlled in the interest of maximum safety of operation, and in which simultaneous control of the engine-power and the clutch is attainable in the interest of maximum smoothness of starting by means of the primary member. In this invention, not only is the brake control member the central control, but in starting all intermediate stages of the clutching operation are controllable by the central control, together with the engine-power associated with the intermediate stages of clutching.

Another important feature of this invention is the simple means by which a conventional form of control commonly used can be obtained if desired.

A further feature of importance is the simple means for regulating the position at which the clutch engages or disengages in relation to the position of the brake control member, and the simple means by which, when the throttle is closed, the clutch can be caused to either disengage, or to remain engaged.

Figure 1:
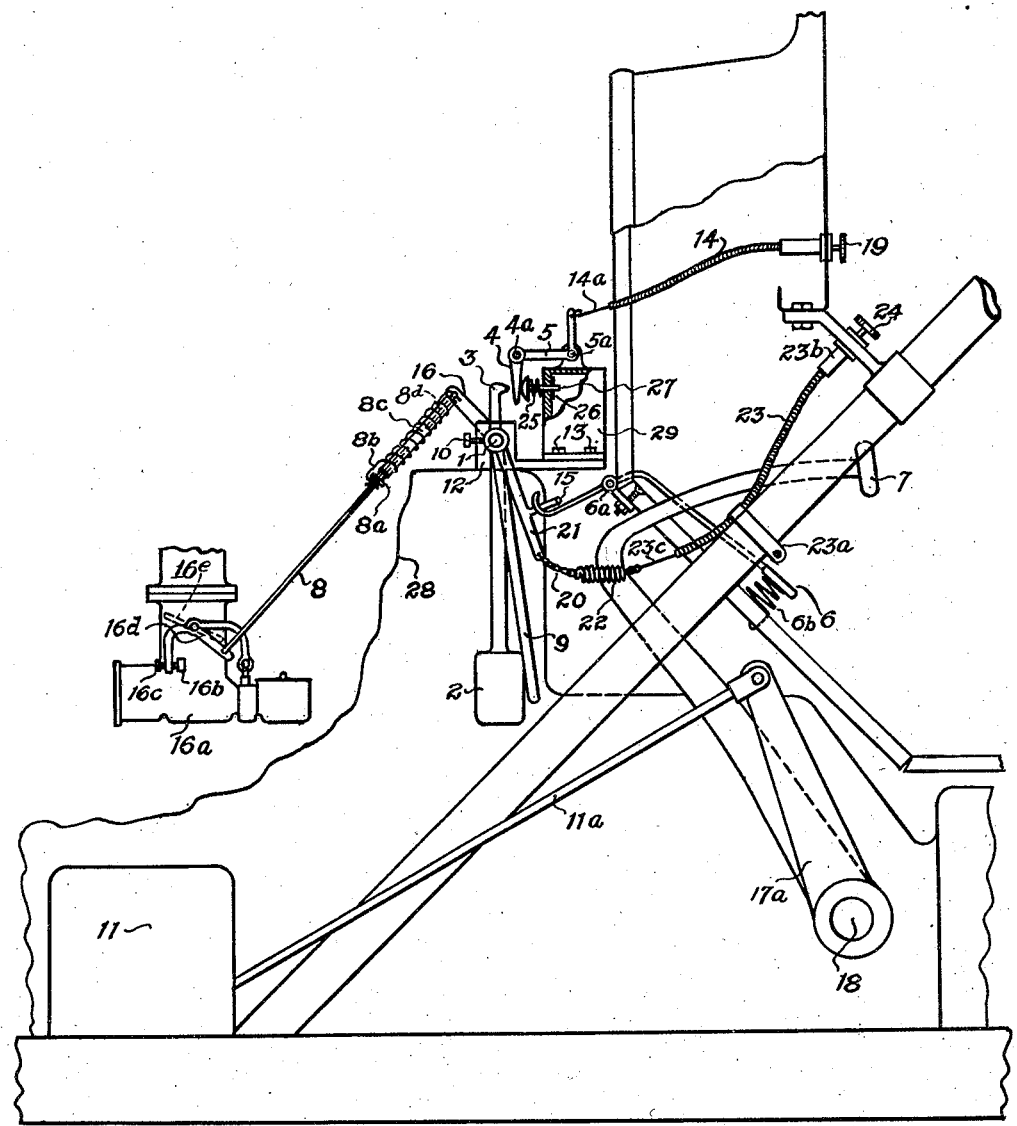
Figure 2:
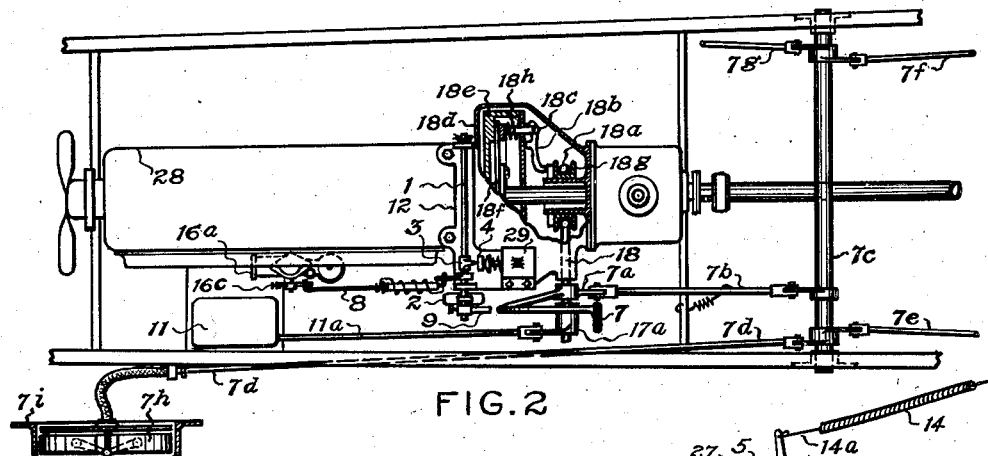
Figure 3:
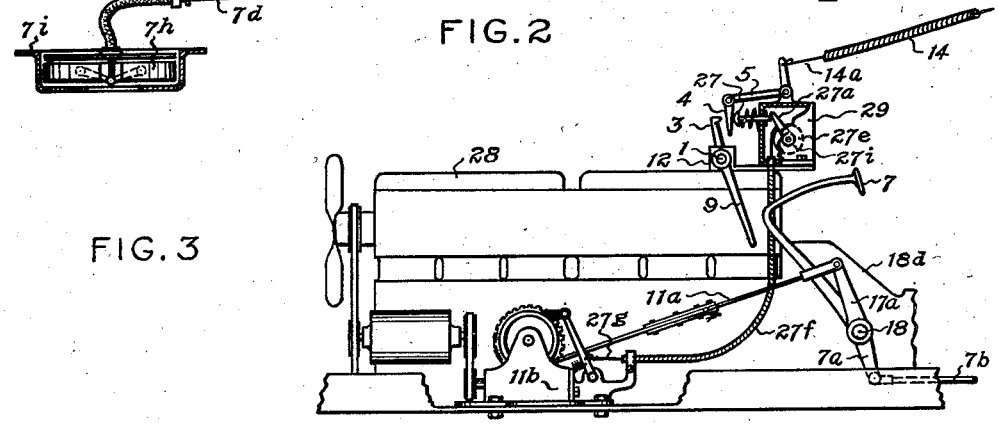
Figure 4:
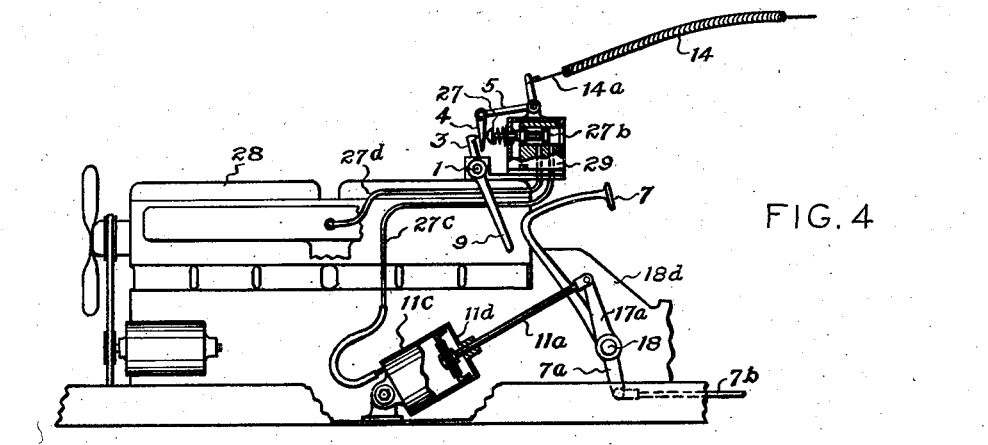

These and other features will be better understood by reference to the accompanying drawings and to the appended claims. Referring to the drawings, Figure 1 shows a complete assembly of the mechanism including an automatic power control mechanism, a clutch actuator, and other controls. Figure 2 shows a plan view of the clutch and brake mechanisms, the automatic power control mechanism, clutch actuator and location of the sensitive control for the clutch actuator. Figures 3 and 4 show in further detail power clutch actuators, and the manner of controlling the actuators by the respective sensitive controls in relation to Figures 1 and 2. In Figure 1 at 26 is shown the engine, at 12 a bearing bolted to the top of the engine by the cylinder head bolts, the bolts not being apparent in this figure. At 1 is shown a cross-shaft which is held in the bearing 12. Securely attached to the cross-shaft 1, is the arm 9, the pendulum 2, the control member 21, the arm 3, and the arm 16. The arm 9 is fastened to the shaft 1 by the set-screw 10, and the other members are similarly fastened to the shaft 1 by set-screws not shown in the figure. The arm 16 is connected to the throttle arm 16d by means of the rod 8, the throttle arm being connected with the throttle 16e. The linkage between 16 and 16d is fixed in length for positive opening of the throttle, but can be stretched upon closure of the throttle arm 16d upon the stop 16b. The tube 8c fits loosely over the rods 8 and 8d, the rod 8 being operatively connected with the arm 16d, and the rod 8d being operatively connected with 16. The spring 8b connected between 8 and 8d as shown, constrains the linkage between the arms 16 and 16d to a fixed length for opening the throttle, and permits the arm 16 to be rotated farther in the clockwise direction than the limit fixed by the stop 16b. By this means, the arms 16 and 9, and the pendulum 2 can be rotated by means of 7 to a limit determined by the complete application of the brakes as hereinafter further explained, without excessive strain upon the stop 16b. At 8a is a nut for adjusting the length of the rod 8. At 16a is a carburetor, and at 16c a screw for adjusting the position of closure of the throttle. At 23 is a flexible cable which terminates at a convenient location, as for example 23b upon the steering-post, and at 24 is a control for the wire 23c within the cable. Linked between the wire 23c and the control member 21 is the chain 20 and the spring 22. At 23a is a band for supporting the cable 23 to the steering-post. By means of the control 24, the spring 22 can be placed under tension so as to deflect the throttle arm 16d to give any desired throttle opening, and the chain 20 permits the pendulum to swing to the right to open the throttle farther upon up-grade and during forward acceleration of the automobile. At 6 is a foot lever pivoted in the bearing 6a, the lever 6 being held in its normal position by means of the spring 6b. One end of the lever 6 is extended as shown, to be capable of engaging the spur 15 of the control member 21. At 7 is shown a brake pedal free to turn about the shaft 18 and capable of engaging the arm 9, and at 17a is a clutch control lever fixed to the shaft 18. The brake pedal 7 is understood to be operatively connected with the brakes of the automobile, and the clutch control lever 17a is understood to be operatively connected with the clutch of the automobile. For simplicity of illustration, the brake mechanism and the clutch mechanism are not included in Figure 1, however in accordance with established practice, deflection of the brake pedal 7 to the left is understood to operate the brake mechanism, and deflection of the clutch control lever 17a to the left is understood to disengage the clutch. At 11 is shown a power actuator for the clutch, the power actuator being connected to the clutch control lever by the pull member 11a. The control member for the power actuator 11, is shown at 29, mounted by means of the screws 13 upon an extension of the bearing 12. At 27 is shown the control which initiates the operation of the pull member 11a, and disengages the clutch when the member 27 is depressed. The spring 25 returns the member 27 to its normal position as determined by the pin 26 which passes through 27. At 5 is shown a crank pivoted at 5a to the top of the member 29. One end of the crank 5 is attached to the wire 14a which passes through the cable 14 and terminates at the control 19, upon the dash-board. The other end of the crank 5 is pinned at 4a to the wedge member 4, which is free to turn about the pivot 4a.

The operation of the pendulum mechanism has been described in detail in U. S. Patent 1,861,018 and in U. S. Patent 1,915,099 of the present inventor. The detail structure of the mechanism which controls the engagement or disengagement of the clutch by the power actuator 11 is not shown in Figure 1, however, it is assumed that the power actuator has a sensitive control for initiating the operation of the clutch, in a manner well understood, as illustrated for example in Figure 3 or Figure 4. Such a sensitive control may be for example, a valve, a control button as shown in U. S. Patent 1,778,220 or pending application Serial Number 574,894 of the present inventor, or an electric switch as shown in my U. S. Patent 1,901,371. The member 27 is understood to be operatively connected with the sensitive control of the power actuator for the clutch, as for example the power actuators above referred to; the member 27 being connected with the switch 47 of U. S. Patent 1,901,371 mounted within 29, or with the button 35 of U. S. Patent 1,778,220. It will be obvious that the button 35 referred to, can be located within 29, and that the control member 27 may be operatively connected with the sensitive control member of other forms of power actuator for the clutch than those here cited.

When the control 24 is pushed inward to its extremity, and the spring 22 and chain 20 are in a relaxed position, the pendulum mechanism is free to return the throttle to a closed position upon a level plane, or a down-grade. Under this condition when the control 19 is pushed inward to its extremity, the arm 3 actuates the member 27 by displacing the wedge 4, and disengages the clutch. The power can be increased in the conventional manner by the foot lever 6, and whenever the lever 6 is released, the clutch automatically disengages. By pulling out the control 19 sufficiently the clutch can be made to fail to disengage because of the limited displacement of 3 to the right determined by the stop 16b and spring 8c upon down-grade, and by the limited displacement of 7 caused by complete engagement of the brakes, and if a clutch pedal is used instead of the lever 17a the clutch can be operated by foot. With the mechanism shown the clutch can be operated from the brake pedal 7, for as the pedal is deflected it engages the arm 9 and causes the member 3 to actuate the control 27. By adjusting the position of the wedge 4, the exact position at which the clutch disengages in relation to the engagement of the brakes, can be controlled. The setting of the control 19 and wedge 4 for use with the brake pedal control of the automobile, is made by applying the brakes completely by means of 7 and adjusting the position of the control 19 so that gradual release of 7 gives smooth starting of the automobile.

When the control 24 is pulled out to give an initial displacement of the pendulum 2 from its normal position the automobile can be entirely controlled in starting and running by the control member 7. The maximum speed under automatic control is determined by the amount which the control 24 is pulled out. It has been found that in practice a single setting of 24 is adequate for city driving, the adjustment of 24 being made primarily for setting the maximum speed desired upon the open road. For example, if the control 24 is set for a maximum speed of 25 miles per hour, in starting, the pedal 7 is deflected by the operator sufficiently to take up the lost motion between 7 and 9 and at the same time close the throttle to the idling position. The pedal 7 is understood in accordance with common practice to be returned to its normal position by a spring. As the pedal 7 is released the clutch is engaged and the throttle automatically opens and causes forward acceleration of the automobile. During the period of acceleration the member 2 swings to the right, and provides an additional throttle opening which facilitates getting the automobile in motion. The above process is repeated in order to shift the gears in the transmission mechanism. After the period of acceleration is completed the member 2 accommodates itself automatically to the grade upon which the automobile moves, and gives automatic control of the throttle. If it is desired to slow down to a speed lower than the setting which has been made at 24, it is only necessary to press lightly upon the pedal 7 to operate the arm 9 and close the throttle to the idling position without actually applying the brakes. Referring to Figure 2, a conventional clutch mechanism and a conventional brake mechanism are shown. The shaft 18 terminates in a forked member 18a upon the collar 18g. Within the flywheel 18e the driven frictional disc 18f is normally maintained in frictional contact by the plate member 18c, and by springs, one of which is shown at 18h. By deflecting the clutch control lever 17a to the left, the finger 18b is caused to compress the spring 18h, and to release the normal frictional engagement between the disc 18f and the flywheel. The brake pedal 7 which is supported by and free to turn about the shaft 18, is operatively connected to the extension 7a, to rod 7b and the shaft 7c which connects with the pull members 7d, 7e, 7f, and 7g of the brakes, one of which is shown at 7h within the drum 7i.

Referring to Figure 3, the power actuator 11b of the type disclosed in U. S. Patent 1,778,220 or in pending application Serial Number 574,874, is shown. The flexible wire 27g connects with the sensitive control member of the clutch actuator unit, and passes through the loosely fitting flexible cable 27f which terminates in 29. The other end of the flexible wire 27g is fastened to the drum 27e which is free to turn in bearings, one of which is shown at 27i. The arm 27a which is fixed to the drum 27e is arranged so that motion to the right of the control member 27 displaces the sensitive control member of the clutch actuator unit, and actuates the pull member 11a.

Another form of power clutch actuator is shown in Figure 4, at 11a, the pull member 11a being connected with the piston within 11c. The clutch within the housing 18d is controlled by the lever 17a as described in Figure 2, and similarly the brakes are controlled by the brake pedal 7, as described. One side of the piston is open to atmospheric pressure through the port 11d, and the opposite side of the piston may be subjected to reduced pressure through the tube 27c. The control member 27 is operatively connected with the valve 27b when this type of power actuator is used, the connection being made for example by a set-screw, not shown in the figure. The valve 27b is arranged so that the tube 27d which connects with the intake manifold can be connected with 27c by displacement to the right, in a manner well understood.

While I have shown and described my invention for simplifying the control of an automobile by the use of a single control member in starting and stopping, thereby eliminating the rapid shift of foot position from the gas control to the brake control, or vice versa, which is commonly necessary and especially undesirable when starting upon an up-grade, it is evident that the brake control member 7 herein shown as a manually operable pedal may be actuated by power from the engine, and such an arrangement is anticipated for example by the brake control mechanism having a sensitive control device disclosed in a pending application Serial Number 574,894, of the present inventor.

Changes may obviously be made in the construction and arrangement of parts, without departing from the spirit of my invention, and I do not therefore limit myself to the form or arrangement shown.

What is claimed is:

1. In an automobile, a clutch, a clutch actuator, an actuator control, a throttle, a plurality of throttle control means, operating means for said actuator control connected with said throttle and normally disconnected from said actuator control, and variable means for connecting said operating means and actuator control to operate said actuator control exclusively by one of said throttle control means.

2. In an automobile, a clutch, a clutch actuator, an actuator control, a brake control member, and operating means for said actuator control operable by said brake control member, including means readily adjustable while the automobile is in motion for adjusting the operation of said actuator control in displacement relation to said brake control member.

3. In an automobile, a clutch actuator, an actuator control, a brake control member, a throttle, a plurality of throttle operating means, a control mechanism for said actuator control operatively connected with the throttle and normally disconnected from said actuator control, and a selector means for selectively connecting said control mechanism and actuator control.

4. In an automobile, in combination, a clutch, a clutch actuator, a sensitive control for said clutch actuator, a brake control member, a throttle, an automatic throttle control mechanism, means for selectively increasing the throttle opening, means for selectively decreasing the throttle opening, and a mechanism operable by said brake control member for operating said sensitive control to operate said clutch.

5. An automobile control system having a clutch, a clutch actuator, a sensitive control for said actuator, a brake control member, a throttle, a pendulum operatively connected with said throttle, means for selectively decreasing the throttle opening by the brake control member, flexible means for setting said pendulum in displacement with its normal position, and a mechanism operable by the brake control member for actuating said sensitive control.

6. In an automobile, a clutch, an actuator for said clutch, an actuator control, a brake pedal, a foot lever, a throttle, and an automatic throttle operating mechanism, means for controlling said mechanism by said foot lever, means for controlling said mechanism by said brake lever, and an adjustable spacing mechanism capable of contacting said automatic throttle operating mechanism and said actuator control, to operate the clutch.

7. In an automobile, a clutch lever, a clutch lever actuator, an actuator control, a throttle, a foot lever, a brake control member, a mechanism operatively connected with said throttle and normally disconnected from said actuator control, and adjustable means for selectively connecting said mechanism and said actuator control to operate said clutch.

8. In an automobile, a clutch lever, a clutch lever actuator, an actuator control, a throttle, a brake control member, means for controlling said throttle operable by said brake control member, a mechanism operatively connected with said throttle and normally disconnected from said actuator control, and adjustable means for selectively connecting said mechanism and actuator control to operate said clutch.

9. In an automobile, in combination, a brake control member, a clutch, a clutch actuator, an actuator control, a throttle, an automatic power control mechanism connected with said throttle, means operable by the brake control member for closing the throttle, and means operable by the brake control member for engaging said actuator control to operate said clutch.

10. In an automobile, in combination, a clutch, an actuator for said clutch, an actuator control, a brake lever, a foot lever, a throttle, and a throttle operating mechanism, a mechanism having means for controlling said throttle operating mechanism by said foot lever a mechanism having means for controlling said throttle operating mechanism by said brake lever, and a control mechanism capable of variably contacting said throttle operating mechanism and said actuator control to operate said clutch.

11. In an automobile, a clutch, a clutch actuator, an actuator control, a throttle, a control for said throttle, means connected with the throttle, normally disconnected from said actuator control for operating said actuator control and means selective for operatively engaging said actuator control with the first said means.

12. In an automobile, a clutch, a clutch actuator, an actuator control, a brake control member, means normally disconnected from said actuator control operable by said brake control member, and means selective for operatively engaging said actuator control with the first said means.

13. In an automobile, in combination, a clutch, an engine-power operable clutch actuator, a sensitive control member for controlling the clutch actuator, a brake control member, and an actuating mechanism for said sensitive control member operable by said brake control member, having a control means for selectively controlling the actuation of said sensitive control member by said brake control member, and in displacement relation with said brake control member.

14. In combination with claim 13, an engine for propelling the automobile, an engine-motive fluid controller for said engine, a governor for automatically controlling said engine-motive fluid controller, selectively controllable by said brake control member for reducing the flow of engine-motive fluid, and means for selectively increasing the flow of engine-motive fluid.

15. In an automobile, an automotive control system having a brake control member, an engine for propelling the automobile, a clutch, an engine-power operable clutch actuator, a sensitive control for said clutch actuator, an engine-motive fluid controller for said engine, a governor for automatically controlling said engine-motive fluid controller, and means selectively operable by said brake control member for reducing the flow of engine-motive fluid and actuating said sensitive control.

16. In an automobile, an automotive control system having in combination, a brake control member, an engine for propelling the automobile, a clutch, an engine-power operable clutch actuator, a sensitive control for said clutch actuator, an engine-motive-fluid controller for said engine, a governor for automatically controlling said engine-motive-fluid controller, and a mechanism operable by said brake control member for controlling said governor and said sensitive control.

17. In an automobile having a brake control member, an engine motive-fluid controller, a clutch and an engine-power operable clutch actuator controllable by a sensitive control device, a governor operatively connected with the engine motive-fluid controller, responsive to the acceleration and inclination of the automobile to a level plane, and a mechanism operable by the brake control member for controlling said governor and said sensitive control device.

18. In an automobile having a brake control member, an engine motive-fluid controller, a clutch control member and engine-power operable means for operating said clutch control member controllable by a sensitive control device, an inertia-motive governor operatively connected with the engine motive-fluid controller, and means controllable by said brake control member for controlling said governor and said sensitive control device.

19. In an automobile having a brake control member, an engine motive-fluid controller, a clutch control member and engine-power operable means for operating said clutch control member controllable by a sensitive control device, the combination of an interia-motive governor connected with the engine motive-fluid controller, means controllable by said brake control member for controlling said governor and for operating said sensitive control device, and means for selectively controlling said governor.

EDWARD H. LANGE.